(12) United States Patent
Nixon et al.

(10) Patent No.: US 12,128,631 B2
(45) Date of Patent: Oct. 29, 2024

(54) METHOD OF ANALYZING AND UTILIZING SURFACE TOPOLOGY FOR TARGETED LOCAL THERMAL MANAGEMENT IN ADDITIVE MANUFACTURING SYSTEMS

(71) Applicant: Stratasys, Inc., Eden Prairie, MN (US)

(72) Inventors: Jason Robert Nixon, Minneapolis, MN (US); Clint Newell, Chandler, AZ (US); Timothy Diekmann, Maplewood, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 17/522,475

(22) Filed: Nov. 9, 2021

(65) Prior Publication Data

US 2022/0063204 A1 Mar. 3, 2022

Related U.S. Application Data

(63) Continuation-in-part of application No. 16/544,414, filed on Aug. 19, 2019, now Pat. No. 11,192,298.

(Continued)

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29C 64/268* (2017.08);
(Continued)

(58) Field of Classification Search
CPC ... B29C 64/118; B29C 64/393; B29C 64/314; B29C 64/209; B29C 64/268;
(Continued)

(56) References Cited

U.S. PATENT DOCUMENTS 4,517,434 A 5/1985 Million et al.
5,121,329 A 6/1992 Crump
(Continued)

FOREIGN PATENT DOCUMENTS

CN 204936224 U 1/2016
CN 105339154 2/2016
(Continued)

OTHER PUBLICATIONS

International Search Report and Written Opinion mailed Feb. 28, 2023 of PCT/US2022/048667 filed Nov. 2, 2022.
(Continued)

*Primary Examiner* — Jamel M Nelson
(74) *Attorney, Agent, or Firm* — Peter J. Ims; Westman, Champlin & Koehler, P.A.

(57) ABSTRACT

A method for 3D printing a part with an additive manufacturing system includes printing a first portion of a part in a layerwise manner and analyzing a topology of the first portion of the part. The method includes determining a tool path for printing a second portion of the part on a surface of the first portion of the part, and pre-heating the first portion of the part along the tool path as a function of the topological analysis of the first portion of the part. The method includes printing the second portion of the part along the tool path.

15 Claims, 8 Drawing Sheets

Related U.S. Application Data

(60) Provisional application No. 62/765,009, filed on Aug. 17, 2018.

(51) Int. Cl.

| | | |
|---|---|---|
| *B29C 64/268* | (2017.01) | |
| *B29C 64/314* | (2017.01) | |
| *B29C 64/336* | (2017.01) | |
| *B33Y 40/10* | (2020.01) | |
| *B33Y 50/02* | (2015.01) | |
| *B29C 64/118* | (2017.01) | |
| *B33Y 10/00* | (2015.01) | |

(52) U.S. Cl.
CPC .......... *B29C 64/314* (2017.08); *B29C 64/336* (2017.08); *B33Y 40/10* (2020.01); *B33Y 50/02* (2014.12); *B29C 64/118* (2017.08); *B33Y 10/00* (2014.12)

(58) Field of Classification Search
CPC ... B29C 64/336; B29C 64/329; B29C 64/321; B33Y 10/00; B33Y 50/02; B33Y 30/00; B33Y 40/10

See application file for complete search history.

(56) References Cited

U.S. PATENT DOCUMENTS

| | | |
|---|---|---|
| 5,233,150 A | 8/1993 | Schneebeli et al. |
| 5,503,785 A | 4/1996 | Crump et al. |
| 5,866,058 A | 2/1999 | Batchelder et al. |
| 5,939,008 A | 8/1999 | Comb et al. |
| 6,004,124 A | 12/1999 | Swanson et al. |
| 6,054,077 A | 4/2000 | Comb et al. |
| 6,274,839 B1 | 8/2001 | Stone et al. |
| 6,547,995 B1 | 4/2003 | Comb |
| 6,814,907 B1 | 11/2004 | Comb |
| 7,122,246 B2 | 10/2006 | Comb et al. |
| 7,127,309 B2 | 10/2006 | Dunn et al. |
| 7,168,935 B1 | 1/2007 | Taminger et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 8,221,669 B2 | 7/2012 | Batchelder et al. |
| 8,349,239 B2 | 1/2013 | Hopkins et al. |
| 8,419,996 B2 | 4/2013 | Swanson et al. |
| 8,439,665 B2 | 5/2013 | Batchelder et al. |
| 8,647,102 B2 | 2/2014 | Swanson et al. |
| 8,721,947 B2 | 5/2014 | Elyasi |
| 8,801,990 B2 | 8/2014 | Mikulak et al. |
| 8,920,697 B2 | 12/2014 | Mikulak et al. |
| 8,926,484 B1 | 1/2015 | Comb et al. |
| 8,926,882 B2 | 1/2015 | Batchelder et al. |
| 8,955,558 B2 | 2/2015 | Bosveld et al. |
| 8,974,715 B2 | 3/2015 | Hopkins et al. |
| 9,085,109 B2 | 7/2015 | Schmehl et al. |
| 9,724,866 B2 | 8/2017 | Hopkins et al. |
| 9,878,495 B2 | 1/2018 | Douglas et al. |
| 9,910,935 B2 | 3/2018 | Golway et al. |
| 10,041,612 B1 | 8/2018 | Korobkov |
| 10,052,813 B2 | 8/2018 | Armijo et al. |
| 10,059,057 B2 | 8/2018 | Schirtzinger et al. |
| 10,076,870 B1 | 9/2018 | August et al. |
| 10,076,876 B2 | 9/2018 | Mark et al. |
| 10,077,854 B1 | 9/2018 | Korobkov |
| 10,195,786 B1 | 2/2019 | Armijo et al. |
| 10,254,499 B1 | 4/2019 | Cohen |
| 10,364,341 B2 | 7/2019 | Bheda et al. |
| 10,415,898 B1 | 9/2019 | Sunden |
| 10,421,267 B2 | 9/2019 | Reese et al. |
| 10,513,076 B1 | 12/2019 | Freakes |
| 10,538,035 B2 | 1/2020 | Bheda |
| 10,688,581 B2 | 6/2020 | McQueen et al. |
| 10,703,042 B2 | 7/2020 | Armijo et al. |
| 10,766,802 B2 | 9/2020 | Tsao |
| 10,800,095 B2 | 10/2020 | Reese et al. |
| 10,843,403 B2 | 11/2020 | Reese et al. |
| 10,875,246 B2 | 12/2020 | Lee |
| 11,084,276 B2 | 8/2021 | Reese et al. |
| 11,207,824 B2 | 12/2021 | Reese et al. |
| 11,207,825 B2 | 12/2021 | Reese et al. |
| 11,207,834 B2 | 12/2021 | Church et al. |
| 11,312,068 B2 | 4/2022 | August et al. |
| 2002/0129485 A1 | 9/2002 | Mok et al. |
| 2006/0160250 A1* | 7/2006 | Bonassar ............... B33Y 40/00 438/1 |
| 2013/0089642 A1 | 4/2013 | Lipson et al. |
| 2014/0191439 A1 | 7/2014 | Davis |
| 2014/0197576 A1 | 7/2014 | Kraibuhler et al. |
| 2014/0232035 A1 | 8/2014 | Bheda |
| 2014/0291886 A1 | 10/2014 | Mark |
| 2015/0004274 A1 | 1/2015 | Ono |
| 2015/0076739 A1 | 3/2015 | Batchelder |
| 2015/0140151 A1 | 5/2015 | Schmehl et al. |
| 2015/0145174 A1 | 5/2015 | Comb |
| 2015/0183070 A1 | 7/2015 | Jones et al. |
| 2015/0266244 A1 | 9/2015 | Page |
| 2015/0314532 A1 | 11/2015 | Gordon |
| 2016/0001461 A1 | 1/2016 | Gardiner et al. |
| 2016/0031155 A1 | 2/2016 | Tyler |
| 2016/0096327 A1 | 4/2016 | Fry et al. |
| 2016/0207263 A1* | 7/2016 | Gordon ............... G05D 23/1917 |
| 2016/0263832 A1 | 9/2016 | Bui et al. |
| 2017/0072633 A1 | 3/2017 | Hsu |
| 2017/0087767 A1 | 3/2017 | Grewell |
| 2017/0151728 A1 | 6/2017 | Kunc et al. |
| 2017/0157845 A1 | 6/2017 | Bihari et al. |
| 2017/0165792 A1* | 6/2017 | Buller ................. B23K 26/144 |
| 2017/0165915 A1 | 6/2017 | Deng et al. |
| 2017/0225445 A1 | 8/2017 | Gardiner |
| 2017/0232679 A1 | 8/2017 | Gardiner et al. |
| 2017/0259502 A1 | 9/2017 | Chapiro et al. |
| 2017/0334137 A1 | 11/2017 | Nystrom et al. |
| 2018/0001567 A1 | 1/2018 | Juan et al. |
| 2018/0065208 A1 | 3/2018 | Mori et al. |
| 2018/0085998 A1 | 3/2018 | von Burg |
| 2018/0117836 A1 | 5/2018 | Reese et al. |
| 2018/0117837 A1 | 5/2018 | Reese et al. |
| 2018/0117838 A1 | 5/2018 | Reese et al. |
| 2018/0117851 A1 | 5/2018 | Reese et al. |
| 2018/0126637 A1 | 5/2018 | Tyler et al. |
| 2018/0257302 A1 | 9/2018 | Kheng |
| 2018/0281278 A1 | 10/2018 | George et al. |
| 2018/0326658 A1 | 11/2018 | Saito et al. |
| 2019/0091803 A1 | 3/2019 | Twelves |
| 2019/0134913 A1 | 5/2019 | Buratto |
| 2019/0210286 A1 | 7/2019 | Newell et al. |
| 2019/0210287 A1 | 7/2019 | Newell |
| 2019/0240903 A1 | 8/2019 | Isobe et al. |
| 2019/0262986 A1 | 8/2019 | Newell |
| 2019/0337221 A1 | 11/2019 | Reszewicz et al. |
| 2019/0351620 A1 | 11/2019 | Jaiswal et al. |
| 2020/0055239 A1 | 2/2020 | Nixon et al. |
| 2020/0368970 A1 | 11/2020 | Georgeson et al. |
| 2021/0347123 A1 | 11/2021 | Newell |
| 2022/0040924 A1 | 2/2022 | Newell |

FOREIGN PATENT DOCUMENTS

| | | | |
|---|---|---|---|
| CN | 104842557 B | 2/2017 | |
| EP | 2998059 A1 | 3/2016 | |
| EP | 3736107 A1 * | 11/2020 | ......... B29C 35/0288 |
| EP | 3736107 A1 | 11/2020 | |
| EP | 3500418 B1 | 9/2021 | |
| GB | 2532024 A | 11/2016 | |
| JP | 2002500584 A | 1/2002 | |
| JP | 2005335380 A2 | 12/2005 | |
| JP | 2016508086 A | 3/2016 | |
| JP | 5937249 B1 | 6/2016 | |
| JP | 2016141142 A | 8/2016 | |
| JP | 2017100304 A | 6/2017 | |

(56) References Cited

FOREIGN PATENT DOCUMENTS

| KR | 1020160072182 | A | 6/2016 |
|---|---|---|---|
| KR | 1020160089805 | A | 7/2016 |
| WO | 2009057107 | A2 | 5/2009 |
| WO | 2014127426 | A1 | 8/2014 |
| WO | 2014153535 | A2 | 9/2014 |
| WO | 2015193819 | A2 | 12/2015 |
| WO | 2015193819 | A3 | 12/2015 |
| WO | 2016014543 | A1 | 1/2016 |
| WO | 2016019435 | A1 | 2/2016 |
| WO | 2016116139 | A1 | 7/2016 |
| WO | 2016119898 | A1 | 8/2016 |
| WO | 2017210490 | A1 | 12/2017 |
| WO | 2018039260 | A9 | 1/2018 |
| WO | 2018039261 | A1 | 3/2018 |

OTHER PUBLICATIONS

International Search Report and Written Opinion dated Jan. 16, 2018 for corresponding International Application No. PCT/US2017/048056, filed Aug. 22, 2017.
Japanese Office Action, Application No. 2019-510595, dated Sep. 23, 2020.
Japanese Office Action, Application No. 2019-510590, dated Sep. 23, 2020.
Chinese Office Action, Application No. 201780062984.8, dated Sep. 24, 2020.
Japanese Office Action, Application No. 2019-092509, dated Jun. 30, 2020, 8 pages.
Canadian Office Action, Application No. 3,038,750, dated Aug. 26, 2020, 8 pages.
Korean Office Action, Application No. 10-2019-7008283, dated May 7, 2020, 10 pages.
Japanese Office Action, Application No. 2019-510590, dated May 19, 2020, 4 pages.
Japanese Office Action, Application No. 2019-510595, dated May 19, 2020, 4 pages.
Korean Office Action, application No. 10-2019-7008286, date Feb. 27, 2020, 13 pages.
Canadian Office Action. 3034682, dated Feb. 4, 2020, 9 pages.
Zhai ("Additive Manufacturing: Making Imagination the Major Limitation"). (Year: 2014).
International Search Report and Written Opinion dated Nov. 29, 2017 for International Application No. PCT/US2017/048057, filed Aug. 22, 2017.
Chinese Office Action, Application No. 201780062984.8, dated Apr. 22, 2021, 20 pages.
Prosecution history from U.S. Appl. No. 16/327,199, filed Feb. 21, 2019 including: Non-Final Rejection mailed Mar. 15, 2021 and Non-Final Rejection mailed Jan. 1, 2021.
Prosecution history from U.S. Appl. No. 16/327,204, filed Feb. 21, 2019 including: Notice of Allowance and Fee(s) due mailed Oct. 7, 2021; Non-Final Rejection mailed May 20, 2021; and Restriction Requirement mailed Feb. 4, 2021.
Prosecution history from U.S. Appl. No. 16/352,269, filed Mar. 13, 2019 including: Restriction Requirement mailed Feb. 26, 2021.
Notice of Allowance and Fee(s) due from U.S. Appl. No. 16/352,269 mailed Jul. 14, 2021.
Communication pursuant to Art. 94(3) EPC from European Patent Application No. 17761412.0, dated Jun. 28, 2021.
Extended European Search Report from European Patent Application No. 21185497.1, dated Oct. 22, 2021.
Prosecution history from U.S. Appl. No. 16/544,414, filed Aug. 19, 2019 including: Notice of Allowance and Fee(s) Due mailed Aug. 4, 2021 and Notice of Allowance and Fee(s) Due mailed Apr. 8, 2021.
Communication pursuant to Rules 161(1) and 162 EPC from corresponding European Patent Application No. 22821734.5, dated Apr. 19, 2024.

* cited by examiner

METHOD OF ANALYZING AND UTILIZING SURFACE TOPOLOGY FOR TARGETED LOCAL THERMAL MANAGEMENT IN ADDITIVE MANUFACTURING SYSTEMS

CROSS REFERENCE TO RELATED APPLICATION(S)

This application is a continuation-in-part application of U.S patent application Ser. No. 16/544,414 entitled LASER PREHEATING IN THREE-DIMENSIONAL PRINTING that was filed on Aug. 19, 2019, which claims the benefit of U.S. Provisional Patent Application Ser. No. 62/765,009 entitled PIXELATED PREHEATING IN THREE-DIMENSIONAL PRINTING that was filed on Aug. 17, 2018 the contents of both of which are incorporated by reference in their entireties.

BACKGROUND

The present disclosure relates to additive manufacturing systems for 3D printing three-dimensional parts by material extrusion techniques. In particular, the present disclosure relates to analyzation and utilization of surface topology for targeted local thermal management in additive manufacturing systems. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

Additive manufacturing technologies can be used for prototyping (where it has been used for many years) and also for end-use production. For end-use part production, it is desirable to print net-shape parts, or near-net shape parts (i.e., parts that match very closely to the digital representation provided as a source data file, and therefore require little or no post-print processing to achieve the desired tolerances for the size and shape for the part).

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in six degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing, as well as the routing for all toolpaths. In a multi-axis system, material may be deposited in conformable 3D tool paths laid incrementally upon each other in nonplanar layers to form a printed part resembling the digital representation.

Parts are produced in three-dimensional printers using materials such as thermoplastics, with or without fillers. Creating good adhesion of layers that are being printed to layers that have already been printed is a concern for any three-dimensional printing system, especially in an ambient temperature environment. Historically, the build process using thermoplastic materials has taken place in a heated environment to insure good between-layer adhesion and overall part quality, especially when using materials having melt temperatures for semi-crystalline materials or glass transition temperatures for amorphous materials above 125°

C. Thermal management of layers is therefore important, especially when a build environment is not heated.

SUMMARY

One aspect of the present disclosure relates to a method for 3D printing a part with an additive manufacturing system. The method includes printing a first portion of a part in a layerwise manner and analyzing a topology of the first portion of the part. The method includes determining a tool path for printing a second portion of the part on a surface of the first portion of the part, and pre-heating the first portion of the part along the tool path as a function of the topological analysis of the first portion of the part. The method includes printing the second portion of the part along the preheated tool path.

Another aspect of the present disclosure relates to a method for 3D printing a part with an additive manufacturing system. The method includes printing a first portion of a part in a layerwise manner and analyzing a topology of the first portion of the part utilizing a combination of feedback control and feed forward control. The method includes determining a tool path for printing a second portion of the part on a surface of the first portion of the part and pre-heating the first portion of the part along the tool path as a function of the topological analysis of the first portion of the part. The method includes printing the second portion of the part along the preheated tool path.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

Definitions

Unless otherwise specified, the following terms as used herein have the meanings provided below:

The term "additive manufacturing system" refers to a system that prints, builds, or otherwise produces parts, prototypes, or other 3D items and/or support structures at least in part using an additive manufacturing technique. The additive manufacturing system may be a stand-alone 3D printer, a robotic system, a sub-unit of a larger system or production line, and/or may include other non-additive manufacturing features, such as subtractive-manufacturing features, pick-and-place features, two-dimensional printing features, and the like.

The terms "preferred," "preferably," "example," and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above," "below," "top," "bottom," and the like are made with reference to a layer-printing direction of a 3D part. In the embodiments shown below, the layer-printing direction is the upward direction along the vertical z-axis. In these embodiments, the terms "above," "below," "top," "bottom," and the like are based on the vertical z-axis. However, in embodiments in which the layers of 3D parts are printed along a different axis, such as along a horizontal x-axis or y-axis, the terms "above," "below," "top," "bottom," and the like are relative to the given axis.

The term "providing," such as for "providing a material," when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

The term "near-net part" refers to a part that is printed so that it is very close to its final shape after the initial printing. A near-net part matches closely to the digital image provided as a source data file, and therefore requires little or no post-print processing to achieve the desired tolerances for the size and shape for the part.

The term "out of oven" refers to a build environment that is not enclosed within a temperature controlled environmental chamber, but is used and operated outside the confines of an environmental chamber.

The term "3D tool path" refers to tool paths in any direction in free space.

The term "traditional layer-wise fused deposition modeling" refers to a 3D printer or print system that prints substantially in a print plane with 2D tool paths defined by a build substrate with relative incremental movement along a print axis. In some instances, the traditional layer-wise fused deposition modeling 3D printer or print systems have capabilities of moving and extruding material slightly out the print plane.

A "robotic fused deposition modeling" 3D printer or print system utilizes a robot arm to carry a print head or extruder and is capable of extruding material in a 2D tool path and a 3D tool path.

The term "upcoming tool path" is the tool path to be used for printing an extruded road of material onto a subsequent portion of the part.

The term "material-specific bonding temperature" is the temperature at which the material forming the previously printed part portion will bond to the same material or to a second material.

The term "degradation temperature" is the temperature at which the material will degrade where the degradation temperature is dependent upon temperature and time at the temperature.

The term "thermal cycle" refers to the pre-heating of previously printed material along a tool path to a temperature at or above a material-specific bonding temperature, followed by the rapid cooling to below a thermally stable temperature of the pre-heated toolpath and the newly extruded material along the toolpath.

The term "rapid" means a thermal cycle having a duration of less than or equal to about 10 seconds.

A "thermally stable temperature" is a temperature below a glass transition temperature for an amorphous polymer and below a melting temperature for a semi-crystalline polymer.

The term "passive cooling" means cooling with ambient air.

The term "active cooling" means utilizing a cooling fluid to cool extruded material and areas of the part above the thermally stable temperature.

All cited patents and printed patent applications referenced herein are incorporated by reference in their entireties.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The present disclosure is directed to methods and apparatuses for analyzation and utilization of surface topology for targeted local thermal management in additive manufacturing systems. In many instances, the surface topography onto which a bead is extruded along a tool path is irregular. Applying a constant source of energy in a tool path having an irregular surface topography can result in detrimental effects on the part being printed including, but not limited to, thermal degradation and/or deformation.

Local thermal management can be required when the surface is formed of two or more materials having different thermal properties. For instance, a lower temperature support material or part material can be used with a higher temperature part material. In this instance, local thermal management can be utilized to print with a higher temperature material on surfaces having lower temperature materials utilizing local thermal management.

The present disclosure utilizes a combination of feed forward and feedback control to provide local thermal management where the feed forward and feedback control systems account for the physical structure of the part being printed, the physical state of the part being printed, natural properties of the part being printed and combinations thereof. In one embodiment, the feed forward control includes utilizing predicted surface topography and/or predicted materials of the surface and scans of the actual surface topography to control and adjust heating on the surface to providing heating sufficient for adhesion while substantially preventing thermal degradation and/or deformation. Other feedback control devices include infrared scanners and thermocouples used to sense actual temperature and or depth of temperature of the part where the material is being printed. In some embodiments the sensed actual temperature of the heated material and/or the depth of heating into the material can be utilized to adjust the power input from the laser, as the laser's power changes, typically by lessening over time.

Figure 1:
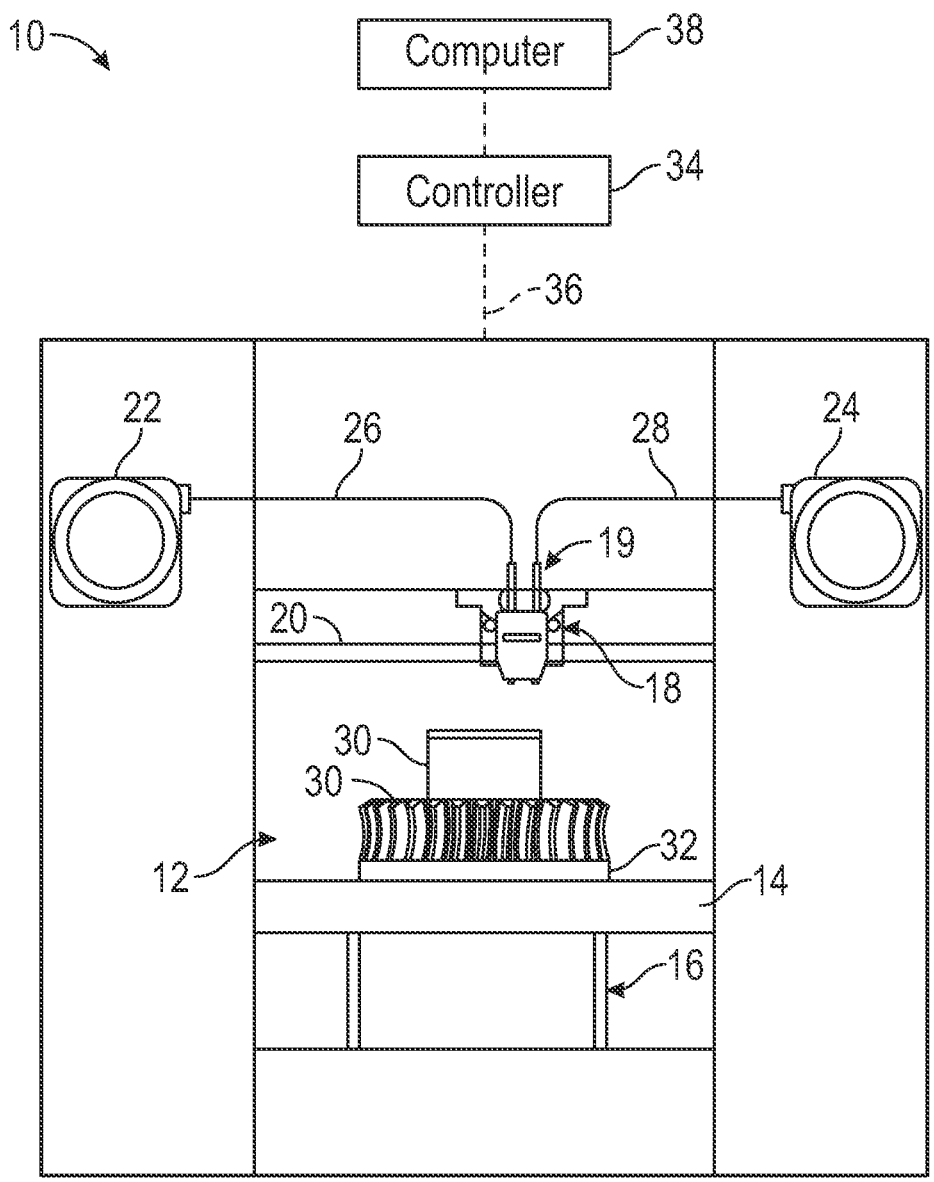
FIG. 1 is a front view of an exemplary additive manufacturing system configured to print 3D parts.

FIG. 1 is a schematic front view of an exemplary additive manufacturing system 10 which may use an extrusion tip insert according to an embodiment of the present disclosure. As shown in FIG. 1, system 10 is an extrusion-based additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 10 include fused deposition modeling systems developed by Stratasys, Inc., Eden Prairie, MN under the trademark "FDM".

In the illustrated embodiment, system 10 includes chamber 12, platen 14, platen gantry 16, an extrusion head or print head 18, head gantry 20, and consumable assemblies 22 and 24. Chamber 12 is an enclosed environment that contains platen 14 and any printed parts. Chamber 12 can be heated (e.g., with circulating heated air) to reduce the rate at which the part and support materials solidify after being extruded and deposited. In alternative embodiments, chamber 12 can be omitted and/or replaced with different types of build environments. For example, parts can be built in a build environment that is open to ambient conditions or may be enclosed with alternative structures (e.g., flexible curtains).

Platen 14 is a platform on which printed parts and support structures are printed in a layer-by-layer manner. In some embodiments, platen 14 may also include a flexible polymeric film or liner on which the printed parts and support structures are printed. In the illustrated example, print head 18 is a dual-tip extrusion head configured to receive consumable filaments from consumable assemblies 22 and 24 (e.g., via feed tube assemblies 26 and 28) for printing 3D part 30 and support structure 32 on platen 14. Consumable assembly 22 may contain a supply of a part material, such as a high-performance part material, for printing printed part 30 from the part material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12. In an alternative embodiment, platen 14 may be configured to move in the horizontal x-y plane within chamber 12 and print head 18 may be configured to move along the z-axis. Other similar arrangements may also be used such that one or both of platen 14 and print head 18 are moveable relative to each other over a desired number of degrees of freedom. Platen 14 and print head 18 may also be oriented along different axes. For example, platen 14 may be oriented vertically and print head 18 may print printed part 30 and support structure 32 along the x-axis or the y-axis.

The print head 18 can have any suitable configuration. Examples of suitable devices for print head 18, and the connections between print head 18 and head gantry 20 include those disclosed in Crump et al., U.S. Pat. No. 5,503,785; LaBossiere, et al., U.S. Pat. Nos. 7,384,255 and 7,604,470; Leavitt, U.S. Pat. No. 7,625,200; Batchelder et al., U.S. Pat. No. 7,896,209; Comb et al., U.S. Pat. No. 8,153,182; Leavitt, U.S. Pat. No. 7,625,200; Swanson et al., U.S. Pat. Nos. 8,419,996 and 8,647,102; Batchelder U.S. Pat. No. 8,926,882; and Barclay et al. U.S. Pat. No. 10,513,104. In one example, during a build operation, one or more drive mechanisms, such as drive mechanism 19, are directed to intermittently feed the modeling and support materials (e.g., consumable filaments via feed tube assemblies 26 and 28) through print head 18 from supply sources 22 and 24.

System 10 also includes controller 34, which can include one or more control circuits configured to monitor and operate the components of system 10. For example, one or more of the control functions performed by controller 34 can be implemented in hardware, software, firmware, and the like, or a combination thereof. Controller 34 can communicate over communication line 36 with chamber 12 (e.g., with a heating unit for chamber 12), print head 18, and various sensors, calibration devices, display devices, and/or user input devices.

System 10 and/or controller 34 can also communicate with computer 38, which can include one or more discrete computer-based systems that communicate with system 10 and/or controller 34, and may be separate from system 10, or alternatively may be an internal component of system 10. Computer 38 includes computer-based hardware, such as data storage devices, processors, memory modules, and the like for generating and storing tool path and related printing instructions. Computer 38 may transmit these instructions to system 10 (e.g., to controller 34) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 38. The computer 38 can communicate with controller 34, which serves to direct the system 10 to print the 3D part 30 and optionally, a support structure 32. Part material is deposited in layers along toolpaths that build upon one another to form the 3D part 30.

Figure 2:
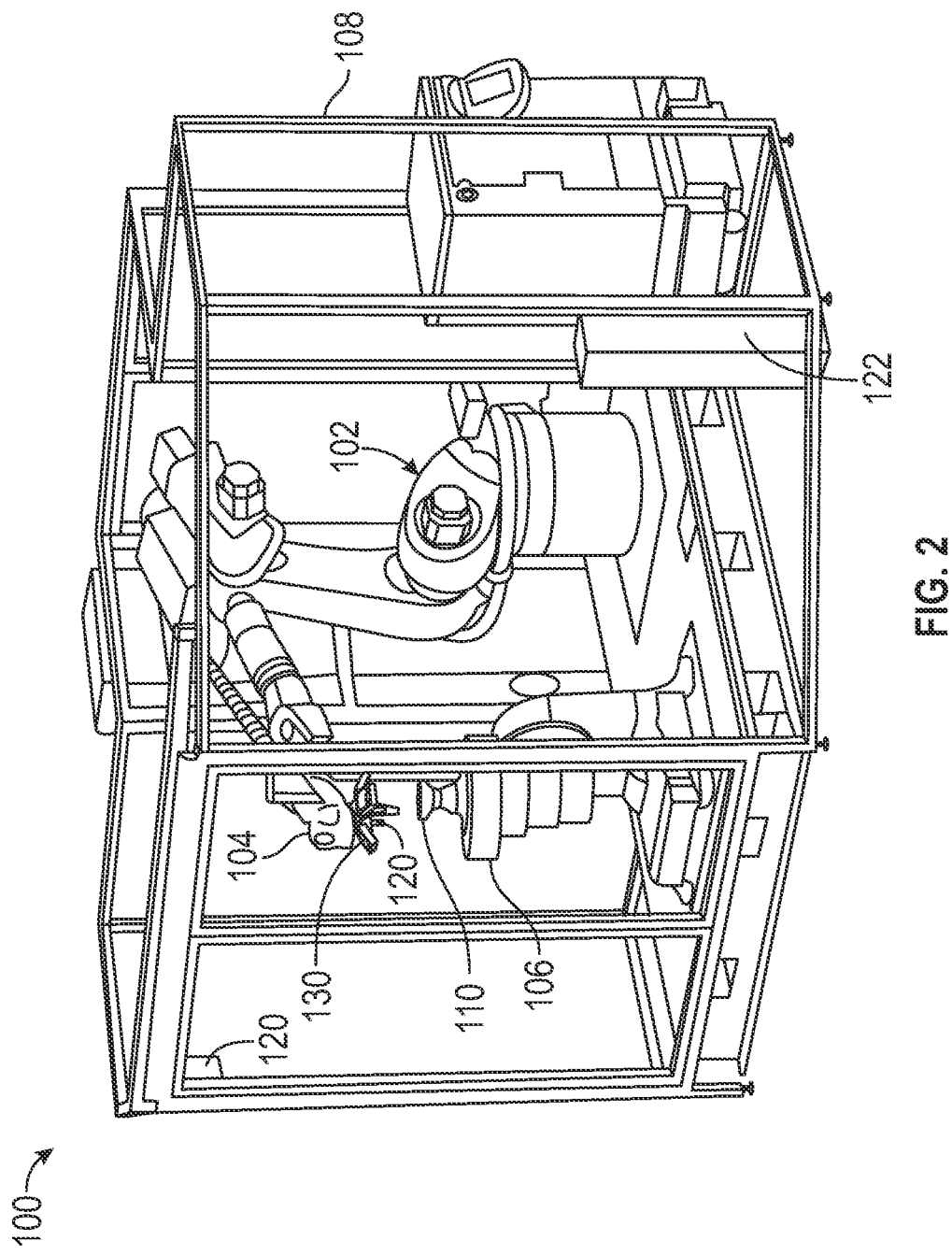
FIG. 2 is a perspective view of an exemplary multiple axis robotic additive manufacturing system configured to print 3D parts.

FIG. 2 is a perspective view of a multi-axis robotic build system 100 that may be used for building 3D parts utilizing two-dimensional tool paths, three-dimensional tool paths and combinations thereof. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom. The robotic arm 102 carries a print head 104, such as, by way of example only and not by way of limitation, a print head similar to print head 18 described above, for printing parts from a filament feedstock. A build platform 106 is provided, which in one embodiment is movable along two axes of rotation, rotation about the z-axis, and tilting (rotation) about the x-axis. A controller 108 contains software and hardware for controlling the motion of the robotic arm 102 and the build platform 106, as well as the printing operation of the print head 104. The system 100 optionally may be housed within a build structure 110.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slowdown of printing, changing the extrusion rate in conjunction with robotic movements, tip cleaning, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

A print head used with a fused deposition additive manufacturing system such as the embodiment of system 10 or 100 typically utilizes a liquefier assembly comprising a liquefier comprised of a liquefier tube and an extrusion tip, such as is disclosed in Swanson et al. U.S. Pat. No. 6,004,124. A heater such as a heating block or a heating coil is positioned about the liquefier tube along a length extending from proximate the outlet end to a location offset from the inlet end. The heater creates a melt zone region within a lower longitudinal region of the liquefier where a filament feedstock is heated and melted to form a melt pool. As filament feedstock is driven into the inlet end of the liquefier, molten material from the melt pool is extruded through an outlet of the extrusion tip at the outlet end. The liquefier tube is typically cylindrical for receiving round filament feedstocks but may alternatively have a rectangular or other cross-sectional geometry configured to receive a ribbon filament or other geometries of feedstock.

Newell, International Published Patent Applications WO 2018/039260 and WO 2018/039261 describe 3D printers on which embodiments of the present disclosure may be practiced. As described in Newell, International Published Patent Application WO 2018/039261, thermal management can be used for printing along the tool path. In one embodiment, localized pre-heating of the tool path ahead of the print head is utilized. The use of a localized pre-heating operation enables elimination of a controlled thermal chamber environment or a reduction of the temperature in the build environment. Localized pre-heating is performed in one embodiment with pre-heater 120. In one embodiment, pre-heater 120 is positioned on, ahead, or near the print head 104 to provide local pre-heating of the tool path on a previously printed portion of the 3D part ahead of the print head and subsequent tool path. In another embodiment, pre-heater 120 is positioned away from the print head, in a position such as on a frame or the like, in view of the printing area. Localized pre-heating along the tool path of the previously printed portion of the 3D part may be performed with a suitable pre-heating apparatus, including by way of example and not by limitation laser pre-heating, hot gas pre-heating, induction preheating, microwave pre-heating, resistive pre-heating, infrared pre-heating, ultraviolet pre-heating, chemical reaction pre-heating, plasma pre-heating, electromagnetic pre-heating, electron beam pre-heating, ultrasonic pre-heating and combinations thereof.

The choice of energy source may be a function of the chemical composition of the material being extruded or the material onto which the material is being deposited. By way of example, the material's physical properties including thermal conductivity, heat capacity, latent heat of fusion, melting temperature of semi-crystalline polymers, glass transition temperature for amorphous polymers, melt flow viscosity, color, whether the color is a gloss or matte, whether the material is loaded with fillers, such as nanoparticles, all can be taken into account individually or in combination with other physical properties. A laser may be selected from a variety of lasers including, by way of example, gas lasers, chemical lasers, dye lasers, metal-vapor lasers, solid-state lasers, semiconductor lasers, free electron laser, gas dynamic laser, nickel-like samarium laser, Raman laser, nuclear pump laser, and any combination thereof.

The physical properties of the thermoplastic materials used to print parts and associated support structures can greatly vary. For instance, the thermoplastic materials can be amorphous or semi-crystalline and can be loaded with materials, such as nanoparticles which increase the absorption of heat into the thermoplastic materials relative to unloaded thermoplastic amterials. In the case of amorphous thermoplastic materials, the materials can begin flowing when the temperature exceeds the glass transition temperature. Some amorphous materials begin flowing at around 100° C. In contrast, semi-crystalline, high performance and engineering grade polymeric materials can have high melting temperatures, such as in the range of 450° C. High performance and engineering grade thermoplastic materials are commonly used in the aeronautics and automotive industry, due to their strength. Exemplary high performance and engineering grade polymers include, but are not limited to, polyetherarylketones such as polyetheretherketone (PEEK), polyetherketoneketone (PEKK), polyethersulfones (PES), polytetrafluoroethylenes (PTFE), polyetherimides (PEI), polyphenylsulfones (PPSU), polysulfones (PSU), polyamides (PA) and polyphenylene sulfides (PPS).

While high performance and engineering grade thermoplastics are desirable because of their strength, these polymers also create printing issues because part quality using FDM printing techniques is optimized when built in a high temperature environment. The cooler the build environment, the faster the extruded material cools. Depending upon the part (and possibly a corresponding support structure) being printed, the extruded material can become sufficiently cool that then next extruded road or bead may not sufficiently bond to the prior extruded material, which can result in weaker layer to layer adhesion and overall part strength. Using localized thermal management provides better bonding between newly extruded layers and prior printed materials, including portions of a part that have significantly cooled.

Figure 3:
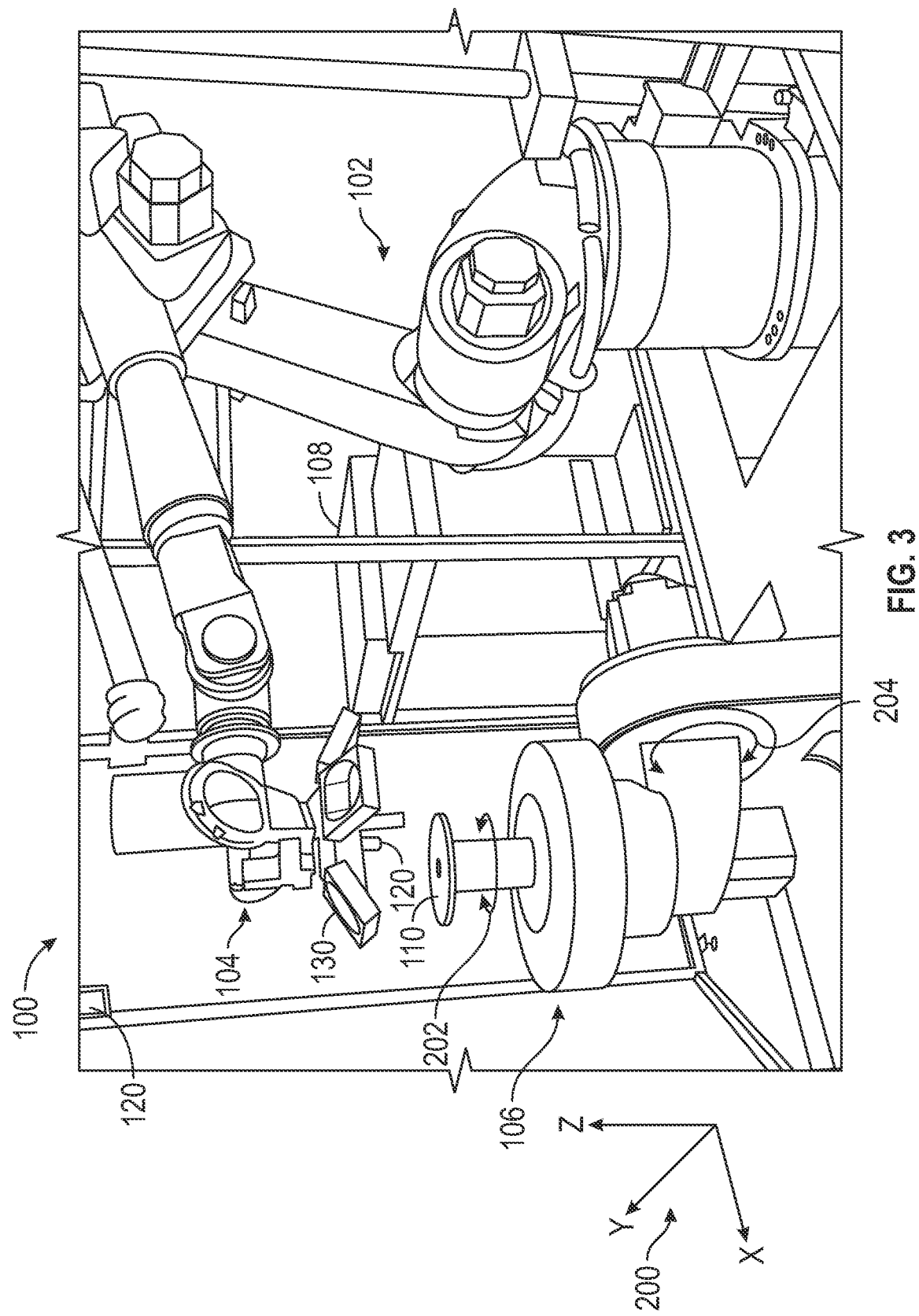
FIG. 3 is an enlarged partial perspective view of the system of FIG. 2.

Referring to FIG. 3, the pre-heater 120 is illustrated being positioned proximate the print head 104. However, the pre-heater 120 may be positioned elsewhere in view of the print head and tool path without departing from the scope of the disclosure, for example on a second robotic arm or the like.

Examples of parts printed with a system such as system 100 are described below and include, but are not limited to hollow parts printed with one or more continuous 3D tool paths and parts printed partially with a 3D tool path and partially with a planar tool path. The parts can include substantially continuous surfaces and/or can have sparse filled regions where the surface is irregular. What is meant by irregular is that the upper-most surface includes regions of material and regions without material or the upper-most surface includes two or more materials having different thermal properties. The illustrated 3D parts are exemplary and non-limiting in nature; the present system 100 can print solid parts, hollow parts, sparse filled parts and combinations thereof.

The present disclosure utilizes local thermal management (LTM) to improve cohesion/adhesion between the material being extruded along a tool path and onto a cooler previously deposited material. LTM is particularly useful when printing parts with performance and engineering grade thermoplastic materials, such as PEEK, PEKK, PES or combinations thereof, by way of non-limiting example. LTM is also particularly useful when printing onto a sparse-filled surfaces, such as when an outer surface is printed onto a sparse-filled structures which have open regions or voids in the surface, which is referred to as skinning or shelling. LTM is also useful when printing performance and engineering grade thermoplastic materials onto thermoplastics with lower melting or glass transition temperatures.

By selectively manipulating upcoming substrate temperature with a sufficient energy source, such as a VCSEL, fiber laser, or a hot jet, for example, cohesion/adhesion between the previous extruded layer or previously printed portion of a part (substrate) and newly deposited hot material (molten bead) is improved via improved localized elevated temperature and polymer diffusivity at the material interface. An irregular previous layer can be heated to a temperature that can cause thermal degradation of previously printed materials. The thermal degradation of the deposited materials can result in deformities in the printing of the part. For example, when skinning or shelling a part, the print surface to be deposited on can be sparse and irregular. Additionally, if the prior printed portion of the part has sufficiently cooled, there may be shrinkage that can affect print quality. In the case of 3D printed parts with complex internal and surface topologies, knowledge of the location of material subject to temperature control, in this case via pre-heating, can be utilized to apply the appropriate application of local thermal management (LTM).

A method to address these problems includes varying laser application based on previous toolpaths. Utilization of real-time, in-process sensed variables with feedback control and a-priori knowledge of surface and volumetric topology used as feed forward control is utilized for application of appropriate LTM conditions in part printing involving geometries transcending simple planar forms. Exemplary, and non-limiting sensors used to sense variables includes optical sensors that provide information regarding the actual location of a layer or portion of a part printed and thermal sensors for sensing the temperature of the previously deposited materials and or the thermal energy imparted by the optical energy along the tool path. Exemplary sensors include optical cameras for sensing actual topology and IR cameras and thermocouples for sensing temperatures of the deposited material(s) along the toolpaths. For operations such as skinning and bridging, or for multi-material/sparse/non-planar builds, LTM conditions depend on the state/composition of the upcoming substrate, or lack thereof.

Figure 4:
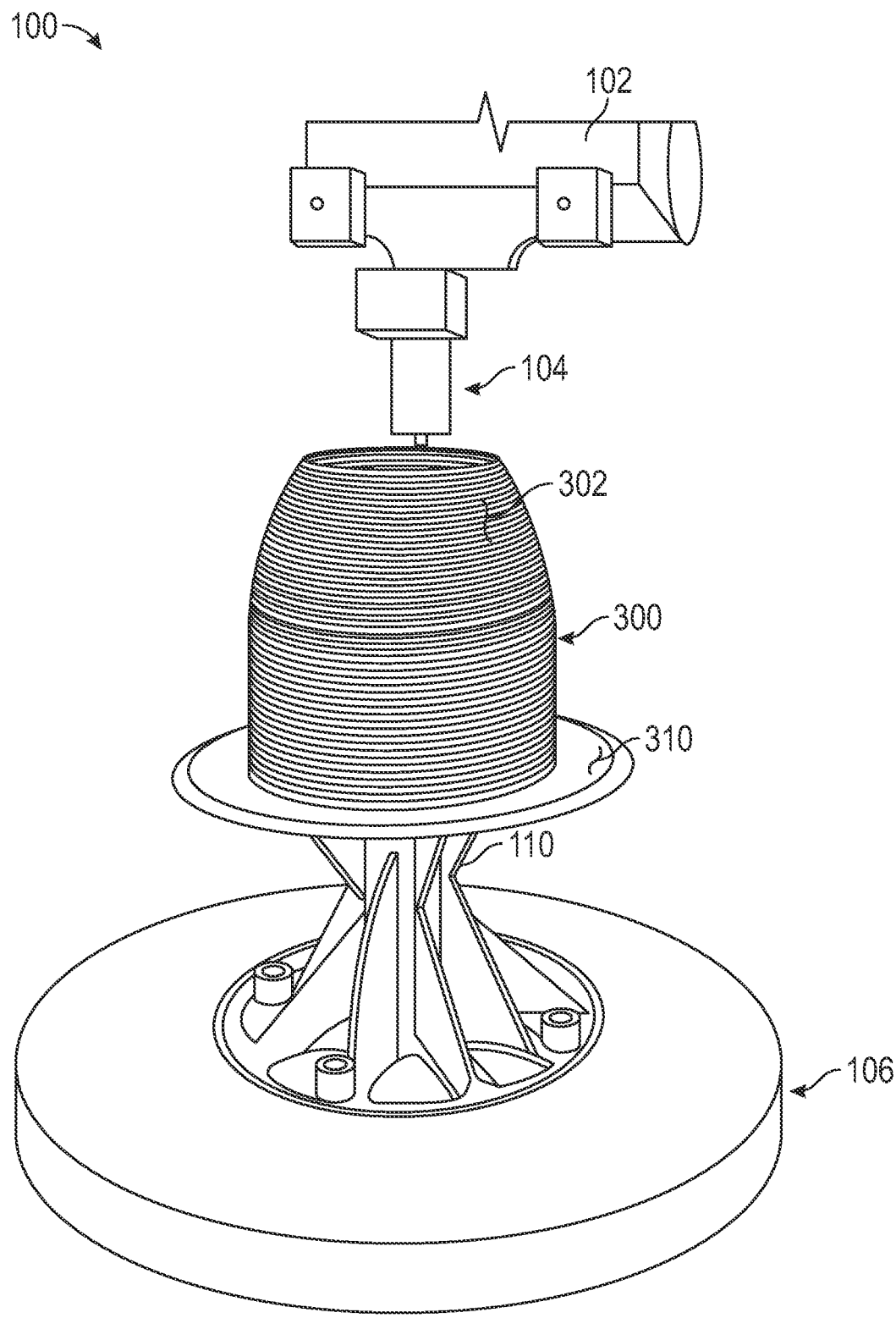
FIG. 4 is a perspective view of a part being printed on the system of FIG. 2.
Figure 5:
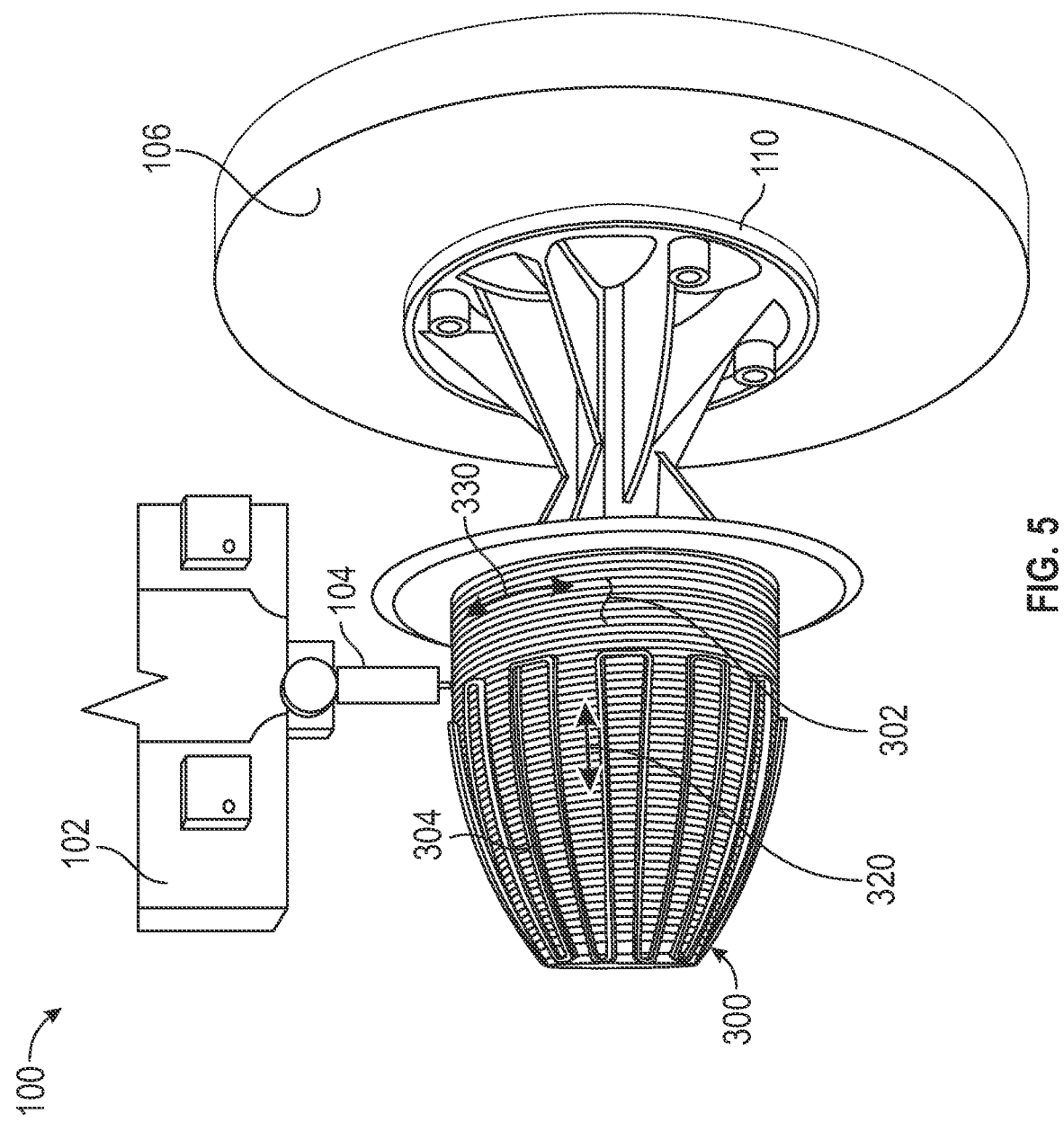
FIG. 5 is a perspective view of the part of FIG. 4 being printed on the system of FIG. 2, with a tilted build platform compared to the configuration of FIG. 4.
Figure 6:
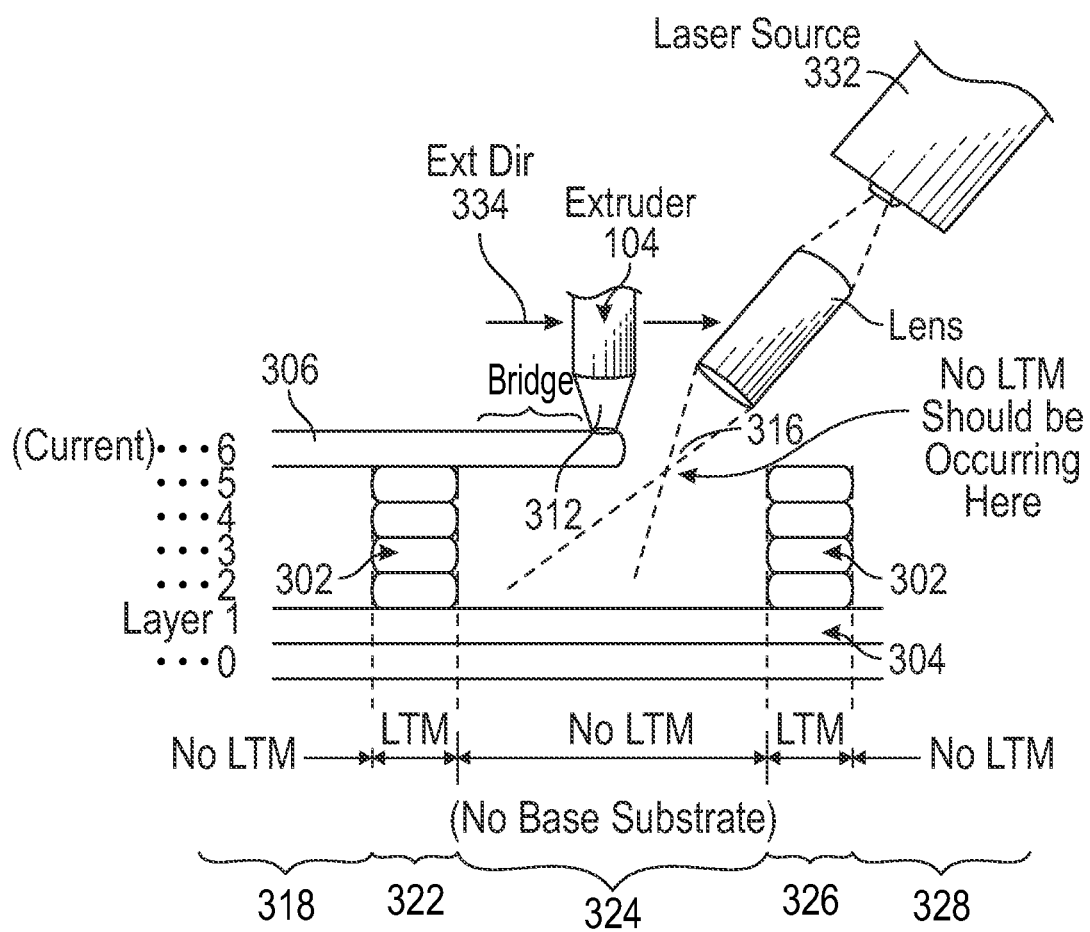
FIG. 6 is a schematic elevation partial view of the part of FIG. 4 having a skin layer printed thereon.

Referring to FIGS. 4-6, an example of use of advanced material deposition knowledge is in a skinning operation.

During skinning, a bead of material is bridged across a sparse structure or another skin to create a locally fully dense skin. An example of skinning would be in the final operation performed on the radome part 300. Broadly, printing of the radome part 300 is composed of three FDM operations; 1) a thin-walled cone 302 is printed, 2) a sparsely filled structure 304 is conformally printed on the cone's exterior (for example hexagonal or wavy-sinusoid), and finally 3) a thin-walled skin 306 is printed on top of the sparse structure 304 to seal the sparse structure 304 against the environment. Operation two (2) is straightforward with LTM because the cone 304 is dense, such that the toolpath of the fill pattern always has underlying material. However, depending on toolpath generation methodology, operation three (3) requires bridging, where material is extruded without an underlying substrate. The described method adapts LTM to the underlying material presence (or lack thereof), structure, or pattern (i.e., topology) so as not to expose unwanted material, or machine areas, to excess heat.

FIG. 6 illustrates the use of bridging. Application of laser power thermal management (TM) during the extrusion over the un-supported zone (no base substrate 304) is unnecessary. Likely, there is an initial overdrive of the laser to prepare for the incoming material as well shortly before extrusion onto the supporting structure. In this application, LTM utilizes the known topological knowledge and sensed topological information in a control loop to prepare for depositing extruded material and applying a selected amount of energy to the surfaces based on input motion conditions and material type.

An alternate example arises when using different materials with different thermal properties, such as model and support materials where preheating the support material may produce undesirable results. This case can be extended further to multi-material printing of a part, optical transmissive properties of the materials such as gloss or matte, color and/or loading with materials such as nanoparticles and combinations thereof. For instance, PEKK LTM conditions are likely to be much more aggressive than one used for a support or ABS/ASA. Here, PEKK LTM conditions would likely cause ABS degradation, potentially leading to a reduction in material properties, material failures, print quality, or safety concerns. LTM conditions are related to thermal transitions of the polymer, speed, temperature, etc. Knowledge of surface, material properties and volumetric topology can be harnessed to apply the correct LTM conditions As mentioned before, topological data for targeted preheat can be acquired and used in several ways including feed forward control using expected topology and expected materials, feedback control using sensed variables and combinations of feedback and feed forward control. LTM can be controlled nearly in real-time using a feedback control system, such as, but not limited to, a proportional-integral-derivative (PID) loop. For example, temperature of a deposited layer or portion of a part can be sensed with an infrared (IR) camera or non-contact thermocouple. A signal relating to the sensed temperature is sent to a controller that is utilized to control at least one of a power flux, waveform and duration of a laser pulse or train of pulse. The system includes control devices, such as laser controller power electronics. By modifying this control loop to incorporate feed-forward terms such as predicted surface topology or part material, several approaches for real time LTM throttling are possible.

For example, a line scanner can rapidly measure incoming topology, which can be used by the controller to adapt output from the energy source. Using a forward-looking distance measuring device can determine incoming (future) topology. However, this method is not ideal under certain incoming conditions, such as a sharply angled turn, and requires fast calculation of an upcoming toolpath relative to measurements and fast response times.

Another approach to this would be to use a temperature feedback device, where material is either sensed or not sensed at the surface. In this scenario, a fault in the temperature measurement could be correlated to the absence of material. Here, a measurement of zero could indicate no material, which would zero the laser command.

Another alternative is to utilized an in-process sensor to determine the surface topology where the molten material is to be deposited. At the completion of a layer or operation, or more generally any action contributing to changes in part topology and structure, a 3D scanner could be used to assess the resulting surface or structure of previous layers/operations. With analysis, the scan enables the system to identify and interpret the actual surface topology and the temperature profile and depth of penetration after printing and adjust LTM parameters, process, or set-points based on actual material conditions. This can be combined with a-priori, or anticipated topological information to assess part deformation during printing and adjust positions as necessary for printing operations as well as LTM, most likely using key points to map future operations/layers to existing surfaces/material.

Along with the sensed variables, feed forward control can be utilized based upon anticipated information, such as the shape of the part being printed based upon a 3D model. This information is referred to as a priori knowledge. Workflow information of all intended operations (for example, building a parent cylinder and a second cylinder emanating from and normal to the first surface) contains complete 3D and surface topological information at all interim states of the operation. In actual printing, this information forms a baseline, which likely needs to be augmented by in-process monitoring to map expected topology to actual part topology to accommodate for shrinkage, warp and curl. LTM utilizes the a priori knowledge with the sensed variable parameters to provide the necessary energy to effectively bond an extruded bead to a previously formed portion of a part or an irregular topographical surface.

In some embodiments, an open loop control architecture could be used with a known/expected topology to pre-shape the LTM power profile. Power output would be configured based on the anticipated motion profile, material composition, and LTM requirements. A sub-example of this would be to pre-apply laser power ahead of the approaching material, or after leaving a material interface, based on known distance or time offsets.

Additionally, closed loop control strategies involving feed-forward control of power, or rate of change of power, in conjunction with gain scheduling based upon sensed variables could advance the phase response during material/topological transitions and be adjusted, or blended, back to nominal gains when the underlying material presence returns to nominal conditions. For instance, in-process sensors can be utilized to determine topological changes, material presence, or lack thereof. Responsiveness to all topological changes can be tuned as a separate process that may be dependent on part geometry including but not limited print head speed and energy imparted into the previously printed material.

In practice, all of the above methods will likely be applied to some degree to provide for real-time thermal control for controlling preheat temperature. For instance, high speed IR sensors can be used to sense temperature and provide signals to a controller for feedback control, in-process measurement to map nominal to actual part geometry during the printing process can also provide signals to the controller to provide feedback control, sensed temperature after deposition of material along the tool path can provide signal to the controller regarding the performance of the preheater to adjust energy output and a-priori knowledge as feed forward control to inform the controller of anticipated topological structures. The feedback and feed forward control is then used to print more accurate parts with minimal or no thermal degradation.

Figure 7A:
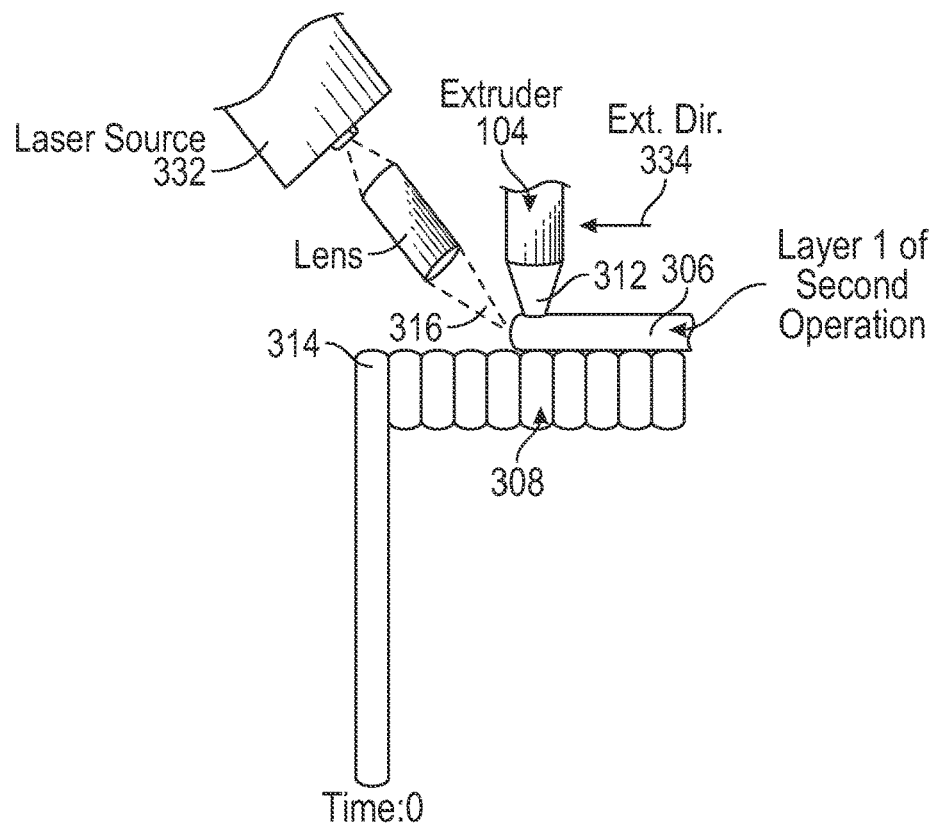
FIG. 7A is a schematic partial view of another part being printed at a first point in time.
Figure 7B:
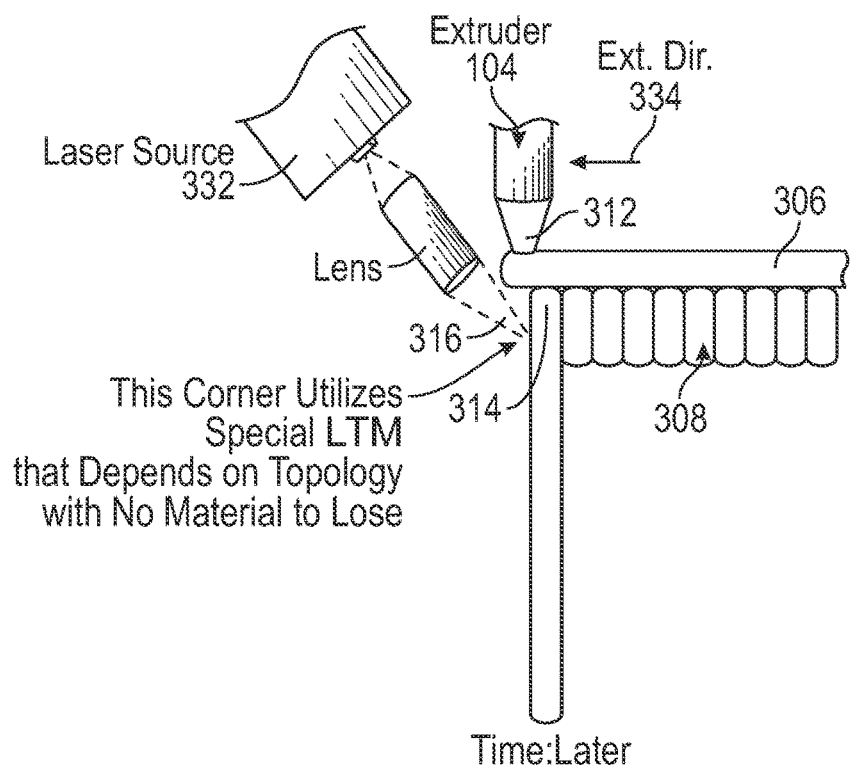
FIG. 7B shows the part of FIG. 7A being printed at a later point in time.

FIGS. 7A and 7B shows the use of LTM for a second skinning or shelling operation. Initially, a portion of the part 308 is printed with multiple layers stacked one on top of the other. Then a conformal skinning printing operation is performed to put a continuous skin 306 on the portion of the part 308. Without utilizing LTM, as the extruder tip 312 of print head 104 approaches the corner 314, the energy source 316 will start to apply too much power to the upcoming surface, as there will very likely be a slowdown in motion associate with the print head turning a corner. Utilizing LTM, the corner 314 will be anticipated so that the energy source 316 preemptively reduces or eliminates the source of energy into the printed material, to accommodate for the changes in topology and accompanying changes in the amount of material in the local area, which acts as a local thermal sink and/or print parameters such as print head speed.

As shown in FIGS. 6-7B, printing includes using one or more of the after-mentioned methods to determine a topology of the previously printed layer(s). For example, in FIG. 6, the currently printing layer is skin layer 306, and the previously printed layer is numbered as "layer 5." A scanner or other measuring or sensing device (not shown) determines that the layer 5 does not exist in zone 318, does exist in zone 322, does not exist in zone 324, does exist in zone 326, and does not exist in zone 328. Thus, when the laser source 332 or other pre-heater 120 travels in extrusion direction 334 ahead of nozzle 312 of print head 104, the output laser beam 316 is controlled as a function of the topology of previously printed layer 5. In one example, the output of the laser beam 316 is turned off or reduced in zones 318, 324 and 328 compared it the laser beam output in zones 322 and 326. Thus, heat for local thermal management (LTM) is provided in zones 322 and 326 to facilitate bonding of portions of the currently printed skin layer 306 (layer 6) to underlying portion 302 (layer 5). However, where layer 6 does not have an underlying layer 5 (shown as a "bridge"), no heat or reduced heat is provided by laser source 332.

In an exemplary embodiment, a method includes monitoring the infrared (IR) emission from the laser-heated portion of the previously printed layer (such as layer 5 in FIG. 6). This is possible as the laser 316 is narrow band, and a cold window (e.g. silicon wafer) can be used to keep the laser light out of the pyrometer. The fraction of the heat that leaves in the form of IR versus the fraction that leaves the heated patch from conduction and convection changes with geometry and with re-radiation from adjoining features.

Figure 8:
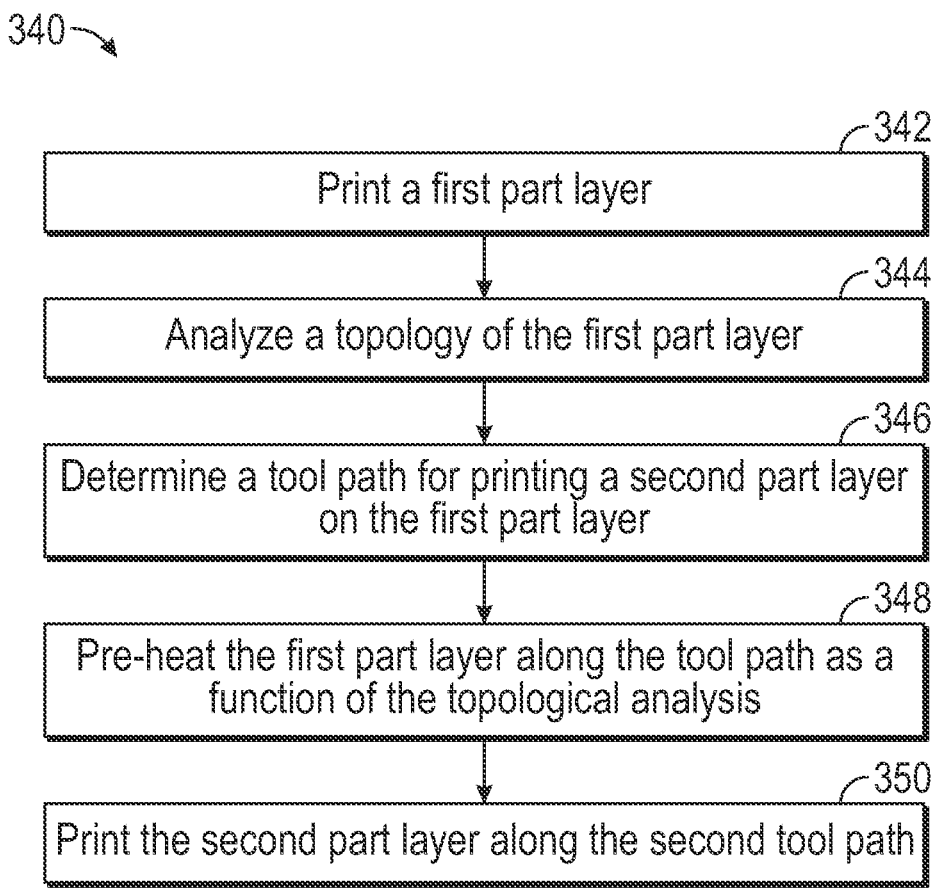
FIG. 8 is a flow chart of a method of printing a 3D part with an additive manufacturing system.

FIG. 8 is a flow chart of an exemplary method 340 of printing a 31) part with an additive manufacturing system. In step 343, the additive manufacturing system 10, 100 is used to print a first part layer. In this description, "first" does not necessarily refer to the layer it is deposited on build sheet 310. Rather, the term "first part layer" is merely used for reference to a previously printed layer. Step 344 includes analyzing a topology of the previously printed part layer. Step 346 includes determine a tool path for the extruder nozzle 312 for printing a second part layer on the first part layer.

Step 348 includes pre-heating the first part layer along the tool path as a function of the topological analysis, ahead of step 350, which includes print the second part layer along the tool path. In an exemplary embodiment, the pre-heating of step 348 is provided at a temperature at or above a material-specific bonding temperature of the first part layer and the second part layer, and below a degradation temperature of the material of the first part layer and second part layer. In an exemplary embodiment, the method includes pre-heating a first portion of the first part layer to a different temperature than pre-heating a second portion of the first part layer. This may be due to the first and second portions having different material compositions (for example, for part and support portions), different topology, and/or other geometric considerations (such as shapes that result in different extruder head motion rates, for example).

Although the present disclosure may have been described with reference to preferred embodiments, workers skilled in the art will recognize that changes may be made in form and detail without departing from the scope of the disclosure.

The invention claimed is:

1. A method for 3D printing a part with an additive manufacturing system, the method comprising:
   printing a first portion of a part in a layerwise manner;
   analyzing a topology of the first portion of the part utilizing a combination of feedback control comprising utilizing a sensed actual surface topology of the part being printed.-and feed forward control comprising utilizing an anticipated surface topology based upon a 3D model;
   determining a tool path for printing a second portion of the part on a surface of the first portion of the part;
   pre-heating the first portion of the part along the tool path as a function of the topological analysis of the first portion of the part; and
   printing the second portion of the part along the tool path.

2. The method of claim 1, wherein feedback control is further utilized by sensing a temperature of the first portion along the tool path.

3. The method of claim 2, wherein the temperature is sensed by a IR camera or a thermocouple.

4. The method of claim 1, wherein feedback control is utilized by sensing the presence of a material or a void in the surface topology.

5. The method of claim 1, wherein feedback control is further utilized by sensing for different compositions in the first portion along the tool path.

6. The method of claim 1, wherein the feed forward control is further utilized by anticipating a speed of a print head along the tool path.

7. The method of claim 1, wherein the preheating along the first portion of the tool path comprising utilizing sensed variables and predicted values of the variables to adjust an energy flux, energy duration or pulses along the tool path.

8. The method of claim 1, wherein preheating along the first portion of the tool path comprises preheating with a laser beam along the toolpath.

9. The method of claim 1, including pre-heating a first segment of the tool path on the first portion of the part to a different temperature than pre-heating a second segment of the tool path on the first portion of the part.

10. The method of claim 9, wherein the first segment is located on a first area of the first portion and the second segment is located on a second area of the first portion wherein the first area is of a different material composition than the second area.

11. The method of claim 10, further including analyzing a material composition of the first area and a material composition of the second area of the first part and pre-heating both the first portion along a first segment of the tool path and pre-heating the second portion along a second segment of the tool path as a function of the composition analysis.

12. The method of claim 1, wherein pre-heating includes varying power of a laser source heater.

13. The method of claim 1, wherein printing the first portion of the part uses a first material and printing the second portion of the part uses a second material that is different from the first material.

14. The method of claim 1, wherein the first portion of the part includes a first area having a material at a surface and a second area of the first portion that that is void of material, the method including pre-heating the first area to higher temperature than pre-heating the second area.

15. The method of claim 1, wherein the first portion of the part includes a first area having a material at the surface and a second area of the first portion that is void of material at the surface, the method including pre-heating the first portion along the tool path and not heating the second portion along the tool path.

* * * * *